(12) United States Patent
Sasaki et al.

(10) Patent No.: US 7,850,068 B2
(45) Date of Patent: Dec. 14, 2010

(54) COMMODITY INFORMATION ACQUISITION AND DISPLAY APPARATUS

(75) Inventors: Yasutsugu Sasaki, Kanagawa (JP); Mahina Nakamura, Tokyo (JP); Maki Sato, Kanagawa (JP); Yumiko Okuma, Tokyo (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 12/365,348

(22) Filed: Feb. 4, 2009

(65) Prior Publication Data

US 2009/0194586 A1  Aug. 6, 2009

(30) Foreign Application Priority Data

Feb. 4, 2008   (JP) ............................. 2008-023696

(51) Int. Cl.
  *G06K 15/00* (2006.01)
  *G06F 17/00* (2006.01)
  *G06Q 20/00* (2006.01)
(52) U.S. Cl. .................. 235/375; 235/383; 705/16; 705/17; 705/21; 705/23
(58) Field of Classification Search ............... 235/375, 235/383; 705/16–17, 21, 23
See application file for complete search history.

(56) References Cited

U.S. PATENT DOCUMENTS 5,497,853 A * 3/1996 Collins et al. ................. 186/61

2005/0156024 A1 * 7/2005 Ichikawa et al. ............ 235/379
2009/0171749 A1 * 7/2009 Laruelle et al. .............. 705/10

FOREIGN PATENT DOCUMENTS

| JP | 63317894 | 12/1988 |
|---|---|---|
| JP | 02220611 | 9/1990 |
| JP | 07311881 | 11/1995 |
| JP | 2004317354 | 11/2004 |
| JP | 2005315796 | 11/2005 |
| JP | 2007172090 | 7/2007 |
| WO | 9104550 | 4/1991 |

OTHER PUBLICATIONS

Japanese Office Action dated Sep. 15, 2009 corresponding to U.S. Appl. No. 12/365,348, filed Feb. 4, 2009.

* cited by examiner

*Primary Examiner*—Michael G Lee
*Assistant Examiner*—Laura Gudorf
(74) *Attorney, Agent, or Firm*—Turocy & Watson, LLP (57) ABSTRACT

A commodity information acquisition and display apparatus includes a commodity information input unit that has a reading window to read commodity information, and reads a commodity code attached to a commodity through the reading window so that the commodity information is inputted, a display unit that has a screen made of a transparent or semi-transparent member and to display specified settlement information based on the commodity information, and is provided to be adjacent to the reading window to enable a customer to simultaneously and visually confirm the commodity and the settlement information through the screen, and a display control unit to control the display of the settlement information.

7 Claims, 7 Drawing Sheets

COMMODITY INFORMATION ACQUISITION AND DISPLAY APPARATUS

CROSS-REFERENCE TO RELATED APPLICATION

This application is based upon and claims the benefit of priority from Japanese Patent Application No. 2008-023696, filed on Feb. 4, 2008, the entire contents of which are incorporated herein by reference.

TECHNICAL FIELD

The present invention relates to a commodity information acquisition and display apparatus which acquires information from each commodity checked by a salesclerk at a checkout counter of a store such as a supermarket store, and displays individual information of each commodity based on the acquired information.

BACKGROUND

A commodity information acquisition and display apparatus constitutes a part of a settlement apparatus to register value information exchanged with a customer as the price of a commodity sold to the customer. As the commodity information acquisition and display apparatus, for example, there is a barcode scanner. The bar code scanner irradiates a laser beam to a barcode symbol attached to each commodity, and captures the laser beam reflected from the barcode symbol.

The barcode symbol is individually read in this way, and the barcode information attached to each commodity is acquired. Each commodity is specified based on the barcode information, and information relating to each commodity, such as price information and name, is displayed on a display.

One of customer's requests to the commodity information acquisition and display apparatus is to confirm consistency between the information displayed on the display and the commodity itself easily and in a short time. As a barcode scanner provided in response to this request, there is known a laser scanner for a barcode reader disclosed in Domestic Re-publication of PCT Application WO91/04550.

This laser scanner is provided on a counter on which a salesclerk performs a check-out operation of a commodity, and is positioned between the salesclerk and a customer who face each other across the counter.

Main parts such as a laser beam scanning optical system including a laser light source, a polygon mirror and the like, and a photoelectric conversion unit are incorporated in the inside of its base. A transparent light guide plate to guide a laser beam to a specified place rises in the vertical direction from substantially the center part of the base.

This transparent light guide plate separates the customer who purchases the commodity and the salesclerk who checks the commodity. A window through which a laser beam freely enters and leaves is provided at the front of the transparent light guide plate on the salesclerk side. A reflective hologram having a special diffraction characteristic is formed at the front (opposite side of the window) of the transparent light guide plate on the customer side. The reflective hologram reflects light of a specific wavelength (for example, green light). On the other hand, light of a wavelength other than the specific wavelength passes through the reflective hologram.

Further, a display whose display screen is directed to the salesclerk side is provided at the end of the base on the customer side. The display screen of the display is also directed to the reflective hologram. The display emits the light of the specific wavelength reflected by the reflective hologram, so that a specified display is performed.

A laser beam generated by the laser light source in the base is incident on the transparent light guide plate, reaches the window while being totally reflected several times in the transparent light guide plate, and outgoes from the window. The laser beam outgoing from the window is reflected by a barcode symbol, again passes through the window, is returned into the transparent light guide plate, and reaches the photoelectric conversion unit in the base. The photoelectric conversion unit performs decoding based on the received light, and outputs barcode information.

In order to cause the laser beam outgoing from the window to be irradiated to the barcode symbol of each commodity, the salesclerk holds each commodity to the window. At this time, an image of each commodity (barcode symbol) held to the window by the salesclerk passes through the window, the transparent light guide plate and the reflective hologram, and is imaged on the retina of the customer. Accordingly, the customer can see the commodity and the barcode symbol held to the window by the salesclerk through the reflective hologram, the transparent light guide plate and the window. At this time, the information image represented by the light of the specific wavelength emitted from the display is reflected and diffracted by the reflective hologram, and enters the eye of the customer. As a result, the customer can overlappingly see a virtual image of price and the like in the vicinity of the commodity (barcode).

However, some customer thinks that when the laser beam irradiated to the commodity (barcode symbol) enters the eye, the health of the eye is damaged. When the laser beam is guided to the window through the transparent light guide plate which the customer directly sees, there is a case where the customer has worry about whether the laser beam is safely guided to the window without being leaked to the outside of the transparent light guide plate at all.

Besides, in the foregoing laser scanner, although the information represented by the display using the light of the specific wavelength is reflected by the special reflective hologram and is visually recognized by the customer, the way of displaying the information as stated above has many problems to be solved.

For example, since the light to represent the information to be seen by the customer does not directly reach the eye of the customer but reaches the eye after being reflected and attenuated by the hologram, the customer sees the information in an unclear state. Especially, since the information seen by the customer is represented by the display using only the light of the specific wavelength reflected by the hologram, it is displayed only with the single color (for example, green), the expressive power is low, and the customer can see only the minimum information such as characters or numerals.

Besides, the display to display the information to the customer is separated from the hologram to approach the customer side, and must be provided between the customer and the hologram. Thus, the customer and the salesclerk are separated, and the communication between both is hampered. Especially, in order to reflect the light representing the information within a suitable angle range, an angle between the hologram and the display is required to be kept at an obtuse angle, not an acute angle, and the distance between the display and the hologram becomes long.

Further, the reflective hologram has a narrow angle range in which light is reflected, and it is difficult to make the range coincident with the view range of every customer, and the information becomes hard to be seen by the customer according to the height of the customer, the standing position or the like.

SUMMARY

The invention is made in view of the above problems, and has an object to provide a commodity information acquisition and display apparatus in which irrespective of conditions such as the height of a customer and standing position, or without increasing the sense of distance between the customer and a salesclerk, the customer can substantially simultaneously and visually recognize a commodity from which information of a code or the like is acquired and information of the commodity displayed based on the acquired information from the commodity.

In order to achieve the object, according to an aspect of the invention, a commodity information acquisition and display apparatus includes a commodity information input unit that has a reading window to read information from a held commodity, and acquires information from each commodity held to the reading window, a display unit that has a screen made of a transparent or semitransparent member through which a visible light passes to display specified information based on the information from the commodity, and is provided to be adjacent to the reading window to enable a customer to simultaneously and visually confirm a visible image of the commodity passing through the screen and the displayed information on the screen, and a display control unit to control the display of the information.

Besides, according to another aspect of the invention, a settlement apparatus includes the commodity information acquisition and display apparatus connected to an electronic cash register (ECR).

According to the invention, irrespective of the conditions such as the height and the standing position, the customer can substantially simultaneously and visually recognize the commodity whose information is inputted and the information of the commodity displayed by the execution of this input operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinafter, embodiments of the invention will be described with reference to the drawings. Incidentally, the embodiments described below are merely examples for explaining the structure of the invention in detail. Accordingly, the invention should not be restrictively interpreted based on the description of the following embodiments. The scope of the invention includes all embodiments including various modifications and improvements of the following embodiments within the scope of the invention as set forth in the claims.

First, a first embodiment will be described with reference to FIG. 1 to FIG. 4. Incidentally, in the description, a salesclerk side indicates this side (lower left direction) of a sacker stand 2 shown in FIG. 1, and a customer side indicates a depth side (upper right direction) of the sacker stand 2.

Figure 1:
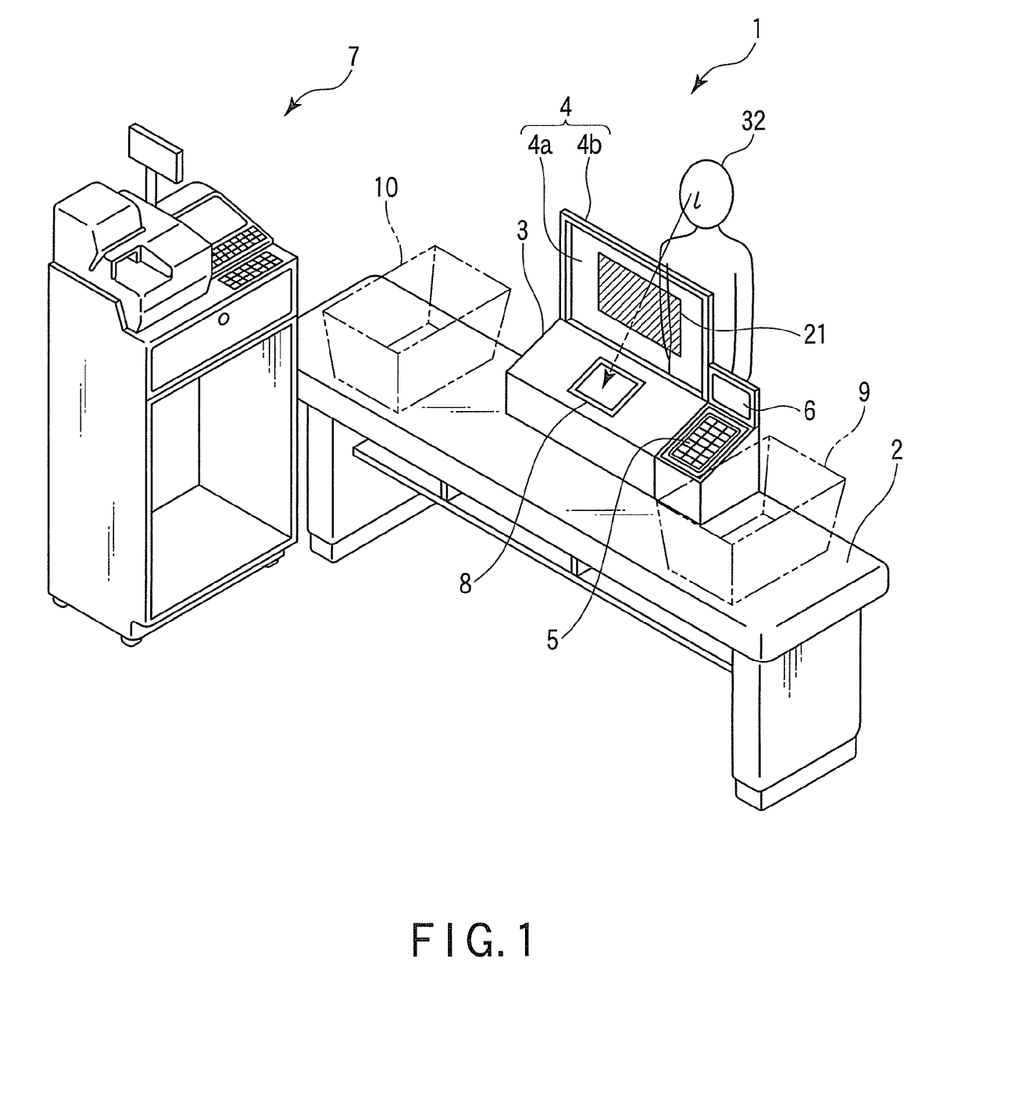
FIG. 1 is a perspective view showing a checkout counter provided with a settlement apparatus including a commodity information acquisition and display apparatus of a first embodiment.

FIG. 1 is a structural view of a checkout counter provided with a settlement apparatus including a commodity information acquisition and display apparatus of the first embodiment. The checkout counter includes a commodity information acquisition and display apparatus 1, an electronic cash register (ECR) 7 constitutes a part of the settlement apparatus, and the sacker stand 2 on which shopping baskets 9 and 10 for containing commodities are placed.

The commodity information acquisition and display apparatus 1 includes a barcode reading device 3 (commodity information input unit) that is placed on substantially the center of the sacker stand 2 and reads a barcode (commodity information) attached to a commodity by a scanning light (laser beam) outgoing from a reading window 8, a not-shown display control unit that is provided in the barcode reading device 3, checks the read commodity information against commodity information master file data stored in a store server connected through a LAN or the like, and specifies individual information such as the name of the commodity and the price, and a display 4 (display unit) that is provided above the reading window 8 and displays the specified information and the like.

The barcode reading device 3 includes a keyboard 5 that is provided to be adjacent to the reading window 8, and is used for a salesclerk to perform data input when necessary, such as information input of a commodity to which a barcode is not attached, and a display 6 for salesclerk that is provided at an upper part of the keyboard 5, and displays data inputted by the keyboard 5, settlement information, setting information and the like.

The electronic cash register 7 is provided at the downstream side, in the movement direction of a commodity and a customer, of the checkout counter, and performs the giving and receiving of money to and from the customer and the output of a receipt based on the settlement result.

Figure 3:
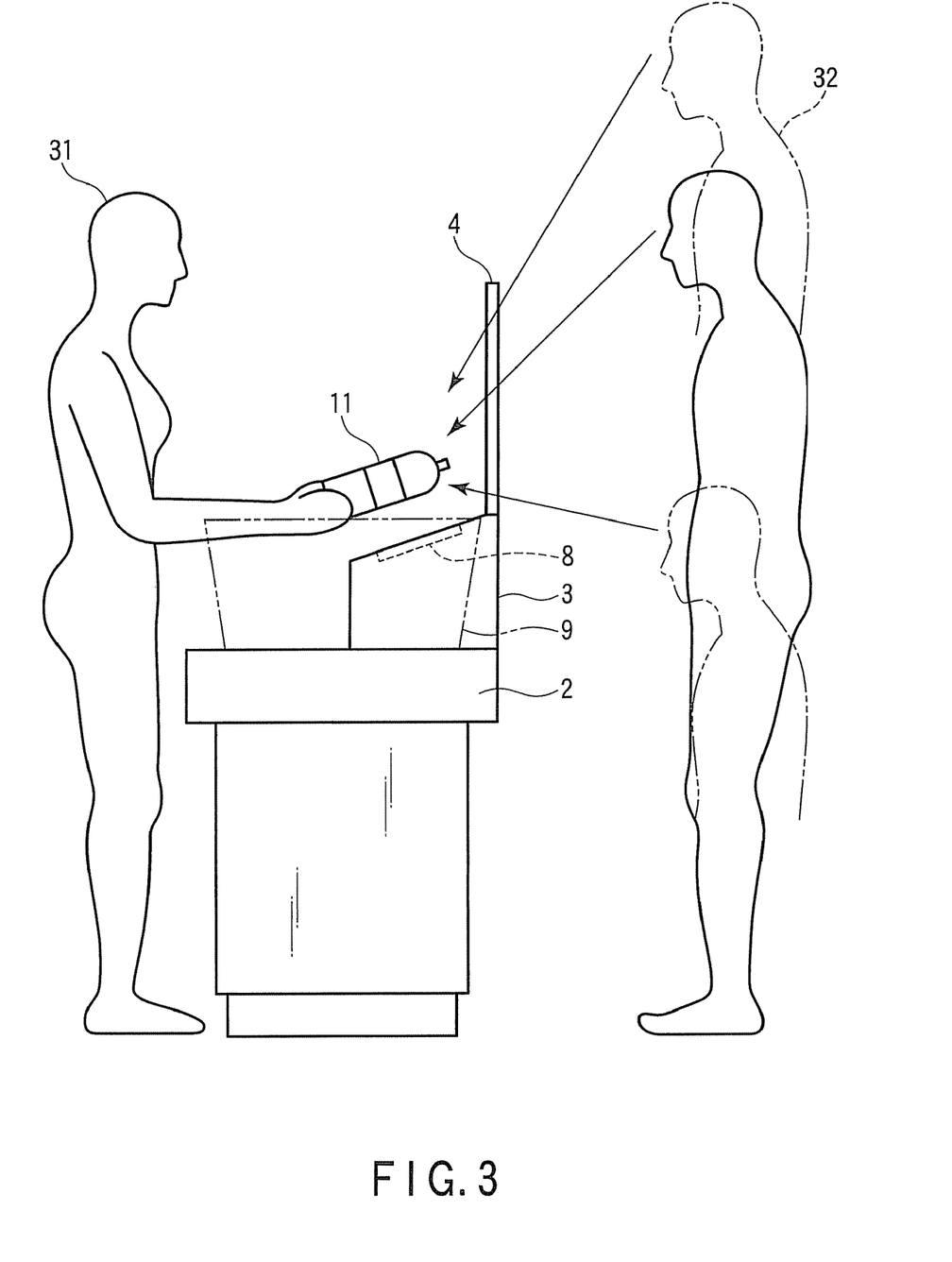
FIG. 3 is a side view for explaining the line of sight from the customer standing in front of the commodity information acquisition and display apparatus of FIG. 1 on the customer side.
Figure 4:
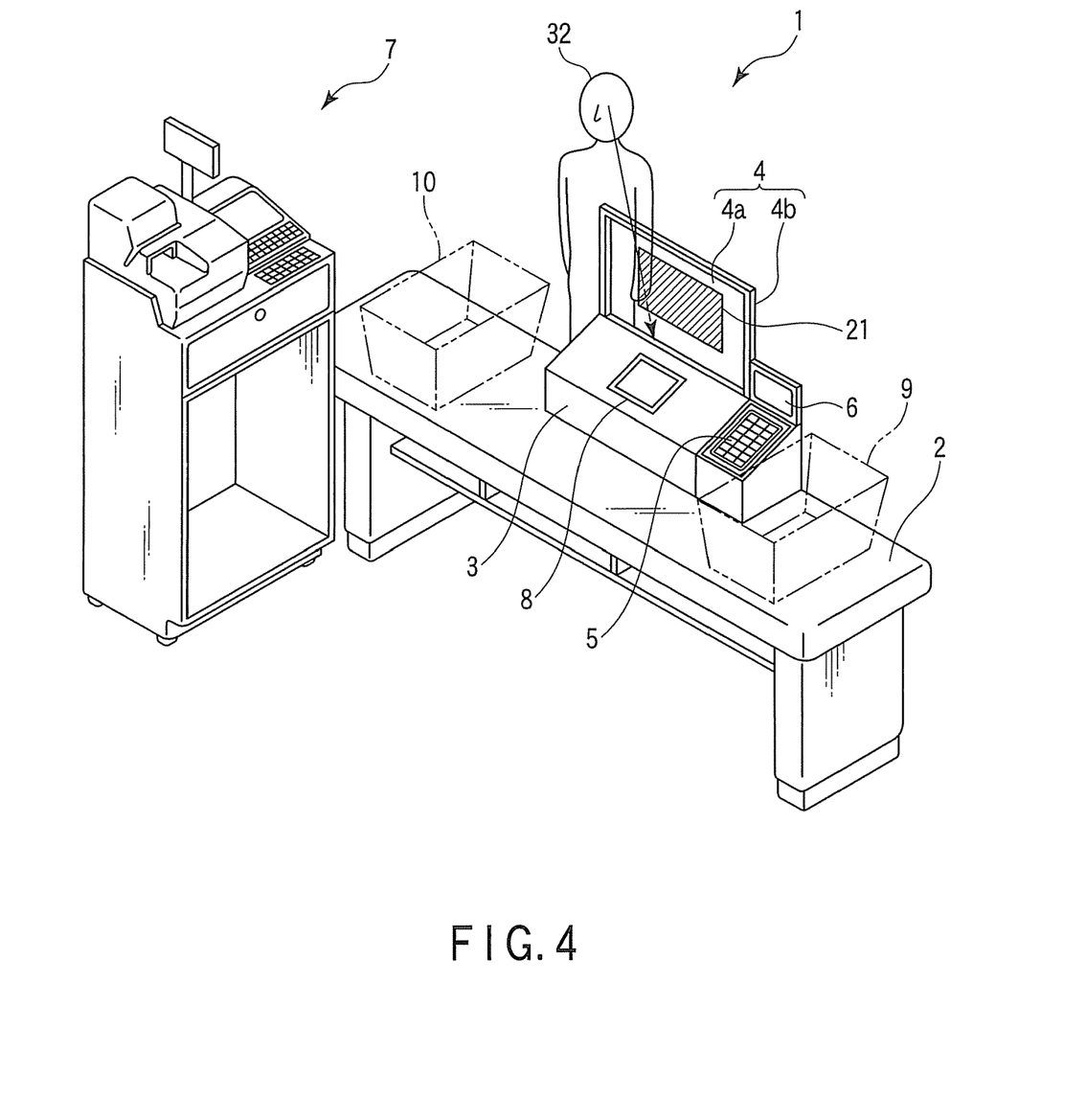
FIG. 4 is a perspective view for explaining the line of sight from the customer standing in front of the commodity information acquisition and display apparatus of FIG. 1 on the customer side and the downstream side.

As shown in FIG. 1, FIG. 3 and FIG. 4, the barcode reading device 3 has a substantially quadrangular prism body having a substantially trapezoidal side, and is placed on the sacker stand 2 so that the longitudinal direction of the body and the longitudinal direction of the sacker stand 2 are the same direction. The reading window 8 is provided on a top surface part of the body so as to be positioned at substantially the center of the body in the longitudinal direction. The top surface part is formed to have an inclined surface extending downward to the salesclerk side, and the scanning light outgoing from the reading window 8 advances in a direction of slightly approaching the salesclerk, not in the vertical direction, within such a range that the light does not enter the eye of the salesclerk.

The display 4 includes a screen 4a composed of a transparent member through which a visible light passes, and a support body 4b to support and fix the screen 4a to the upper part of the barcode reading device 3. In this display 4, the display on the screen 4a is controlled by, for example, the not-shown display control unit provided in the barcode reading device 3, and settlement information, such as commodity name and price, of the commodity whose barcode is read by the barcode reading device 3 is displayed on the screen 4a.

The screen 4a includes, for example, an organic EL panel having transparency. As the organic EL panel, the dual emission organic EL panel is used in which an electroluminescence layer is sandwiched between transparent conductive films in the up-and-down direction, these are further sealed with transparent substrates such as glass plates from above and below, a drive circuit area of TFTs or the like to drive the transparent conductive films and a display area from which the light generated in the electroluminescence layer outgoes are formed not to overlap with each other, so that the light can outgo in the up-and-down direction of the electroluminescence layer. Accordingly, an image displayed on the organic EL panel can be simultaneously visually recognized from the front side and the back side, in other words, from the salesclerk side and the customer side, and the transmission factor of a portion where an image is displayed is adjusted, so that the opposite side can be seen through the panel.

Figure 2:
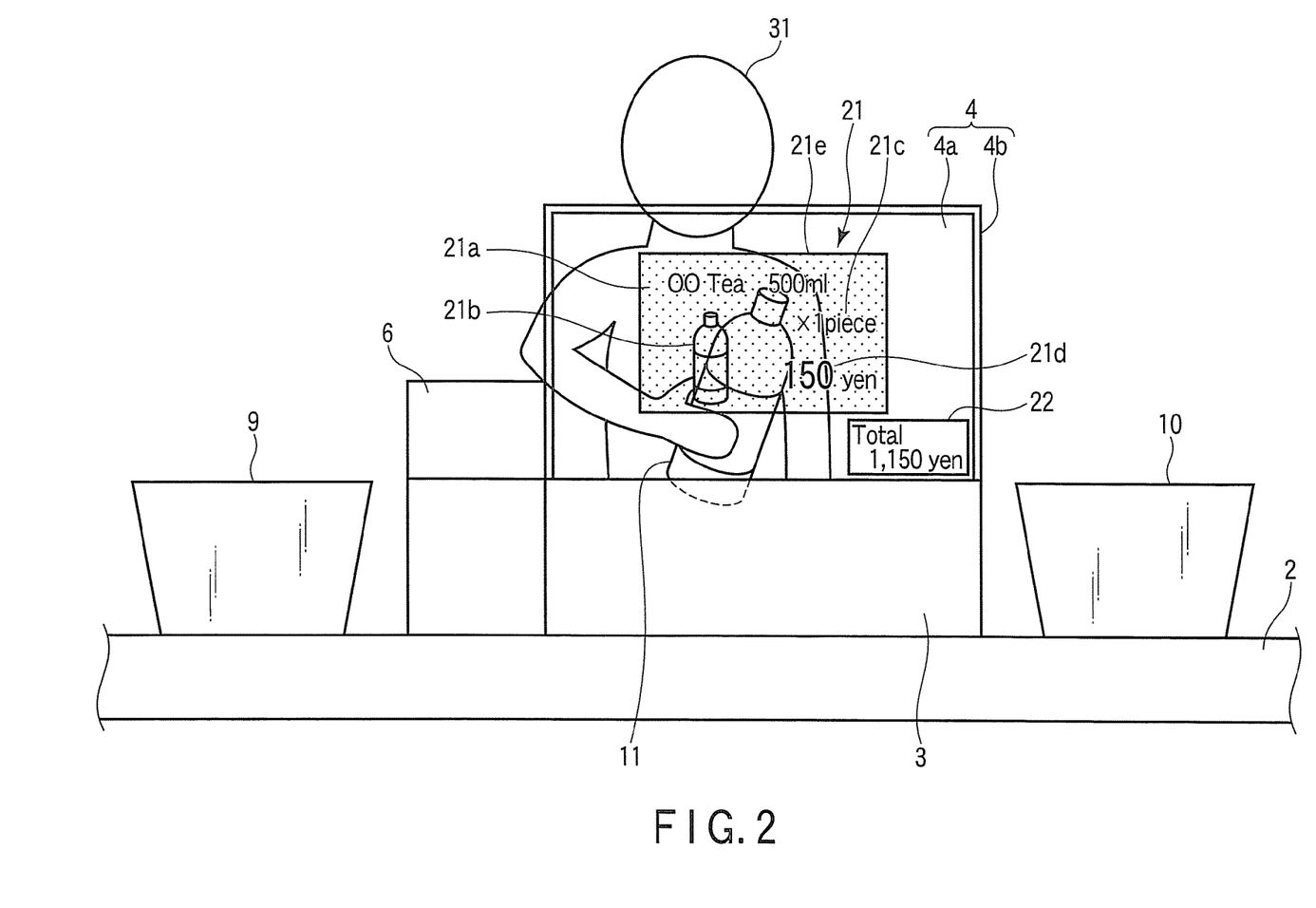
FIG. 2 is a front view for explaining the display content of a display seen from a customer standing in front of the commodity information acquisition and display apparatus of FIG. 1 on the customer side.

Next, a description will be given to a screen displayed on the screen 4a when an input process of information from a commodity is performed.

FIG. 2 shows a state immediately after a salesclerk 31 holds a barcode symbol attached to a commodity 11 to the reading window 8 and causes the barcode reading device 3 to read the barcode, and the state is seen from the customer side.

In this state, individual information 21 (name, price, etc.) of the commodity 11 whose barcode is read by the barcode reading device 3, and total amount information 22 (transaction information) at the present time of the transaction are displayed on the screen 4a.

The individual information 21 includes a commodity name section 21a to represent a commodity name, an image section 21b to represent a picture symbol such as a photograph of a commodity or a picture, a number section 21c to represent the number of read commodities, a money section 21d calculated based on the price of a commodity, the number of commodities and the like, a frame section to surround all of the respective informations 21a to 21d, and an individual information display area 21e composed of a colored section subjected to a coloring process within the frame. The individual information 21 is controlled by the not-shown display control unit so as to be displayed on the wide area of the center part of the screen 4a immediately after the barcode is read by the barcode reading device 3. Thus, as shown in FIG. 1, FIG. 3 and FIG. 4, a customer 32 can substantially simultaneously and visually recognize the commodity 11 immediately after the reading operation is performed and the individual information 21 displayed on the screen 4a through the display 4 without much moving the line of sight.

The respective informations 21a to 21d constituting the individual information 21 are displayed by the self-light emission of the organic EL panel. Thus, with respect to the display surface of the screen 4a, a viewing angle of about 180° is obtained in each of the up-and-down direction and the right-and-left direction. Accordingly, for example, as shown by a broken line in FIG. 3, irrespective of the height of the customer, the customer 32 can visually recognize the respective informations 21a to 21d without fail. Similarly, not only in the case where as shown in FIG. 1, the customer 32 is positioned in front of the display 4 and waits for the settlement, but also in the case where as shown in FIG. 4, the customer is positioned at a place apart from the front of the display 4 in view of customers standing behind or beside and waits for the settlement, the customer 32 can visually recognize the respective informations 21a to 21d without fail.

In the colored section of the individual information display area 21e, the transmission factor is set to be slightly lower than that of the outside of the colored section, so that the colored section becomes semitransparent within such a range that the commodity 11 and the salesclerk 31 can be visually recognized from the customer side, and the colored section has a function to bring the respective informations 21a to 21d displayed within the colored section into clear view by interrupting the background, which is seen through the organic EL panel, to a certain degree. Thus, while keeping the effect that the commodity 11 is visually recognized through the display 4, the visibility of the respective informations 21a to 21d for the customer 32 can be improved.

The individual information 21 is displayed until the salesclerk 31 performs a reading operation of a next commodity. Besides, as stated above, in the first embodiment, not only the commodity name of the commodity subjected to the reading operation but also the photograph of the commodity is displayed on the image section 21b. Accordingly, not only immediately after the reading operation is performed in the reading window 8, but also even after the commodity 11 is put in the shopping basket 10, unless the next commodity is read, the read commodity and the individual information of the commodity can be again confirmed by referring to the image section 21b.

Although not limited to this, the total amount information 22 is displayed in the total amount information display area arranged at a position different from the settlement information display area, and is always displayed until the settlement process (the transaction) of from the first commodity to the final commodity is ended with respect to the plural commodities purchased by the customer. Besides, in order to raise the visibility, the total amount information display area is colored and displayed in the state where the transmission factor is further made lower than that of the individual information display area 21e of the individual information 21, and is arranged at the lowermost position on the screen so that the visual recognition of the commodity 11 by the customer 32 is not hampered.

As stated above, in the first embodiment, the screen 4a of the display 4 is formed of the organic EL panel having the transparency, and the individual information of the commodity subjected to the reading operation is displayed on the screen 4a. Thus, irrespective of the conditions such as the height and the standing position, the customer can substantially simultaneously and visually recognize the commodity whose information is inputted by reading of the commodity code and the individual information of the commodity displayed by the execution of the input operation.

Figure 5:
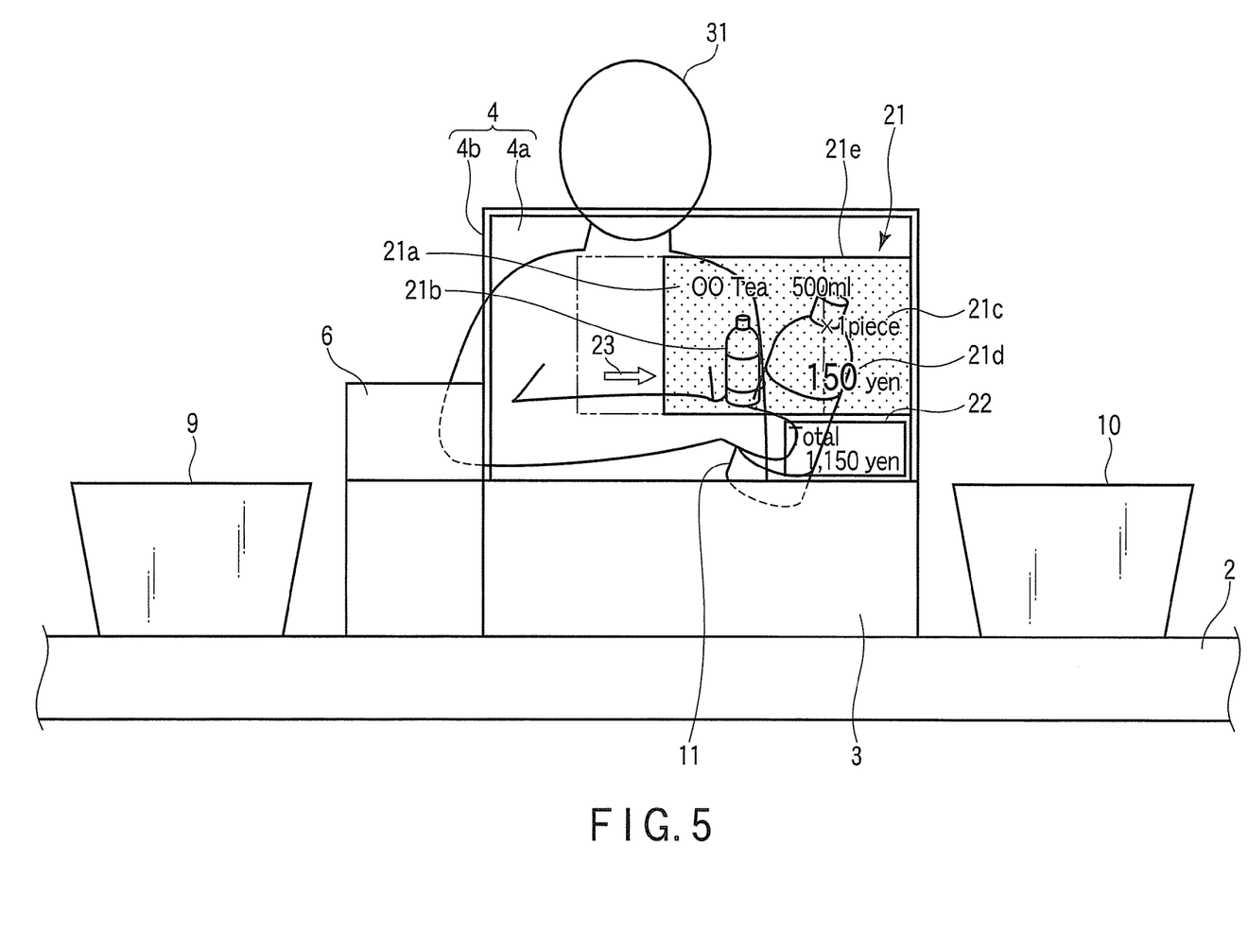
FIG. 5 is a view showing a commodity information acquisition and display apparatus of a second embodiment.

Next, a second embodiment will be described with reference to FIG. 5. Incidentally, the same portion as that of the first embodiment is denoted by the same reference numeral and its detailed description will be omitted.

The second embodiment is different from the first embodiment in a display method of an individual information 21. Immediately after a salesclerk 31 performs a reading operation of a commodity 11, the individual information 21 is displayed on a screen 4a at a position indicated by a two-dot chain line. The individual information 21 is set by a not-shown display control unit so that it is displayed for a specified time (for example, about 1 second) at the position indicated by the two-dot chain line, and is scrolled in a direction indicated by an arrow 23.

The direction of the scroll indicated by the arrow 23 is the same as the direction in which the salesclerk 31 moves the commodity from a shopping basket 9 to a shopping basket 10, and the speed of the scroll is set to be relatively moderate so that a customer 32 can recognize the display content during the scroll of the individual information 21.

As stated above, in the second embodiment, when the reading operation of the commodity 11 is performed, the individual information 21 is displayed on the screen 4a for the specified time, and then is scrolled in the same direction as the movement direction of the commodity 11. Thus, not only immediately after the reading operation of the commodity 11 is performed, but also while the salesclerk 31 is moving the commodity from the reading window 8 to the shopping basket 10, the commodity 11 and the individual information 21 can be substantially simultaneously and visually recognized through the display 4.

Incidentally, the time in which the individual information 21 is stopped and the scroll speed may be arbitrarily set by the not-shown display control unit according to the environment in which the commodity information acquisition and display apparatus 1 is used, the size of the display 4 and the individual information 21, and the like. At that time, it is more preferable that the time of temporary stop is always provided at the start of the movement, the end thereof or therebetween, so that the customer can sufficiently recognize the display content of the individual information 21.

Besides, the range on the screen 4a in which the individual information 21 is scrolled is not limited to that of the embodiment, and it can be suitably set so that the commodity and the individual settlement information can be easily visually recognized by the customer substantially simultaneously.

Next, a third embodiment will be described with reference to FIG. 6. Incidentally, the same portion as that of the first embodiment is denoted by the same reference numeral, and its detailed description will be omitted.

Figure 6:
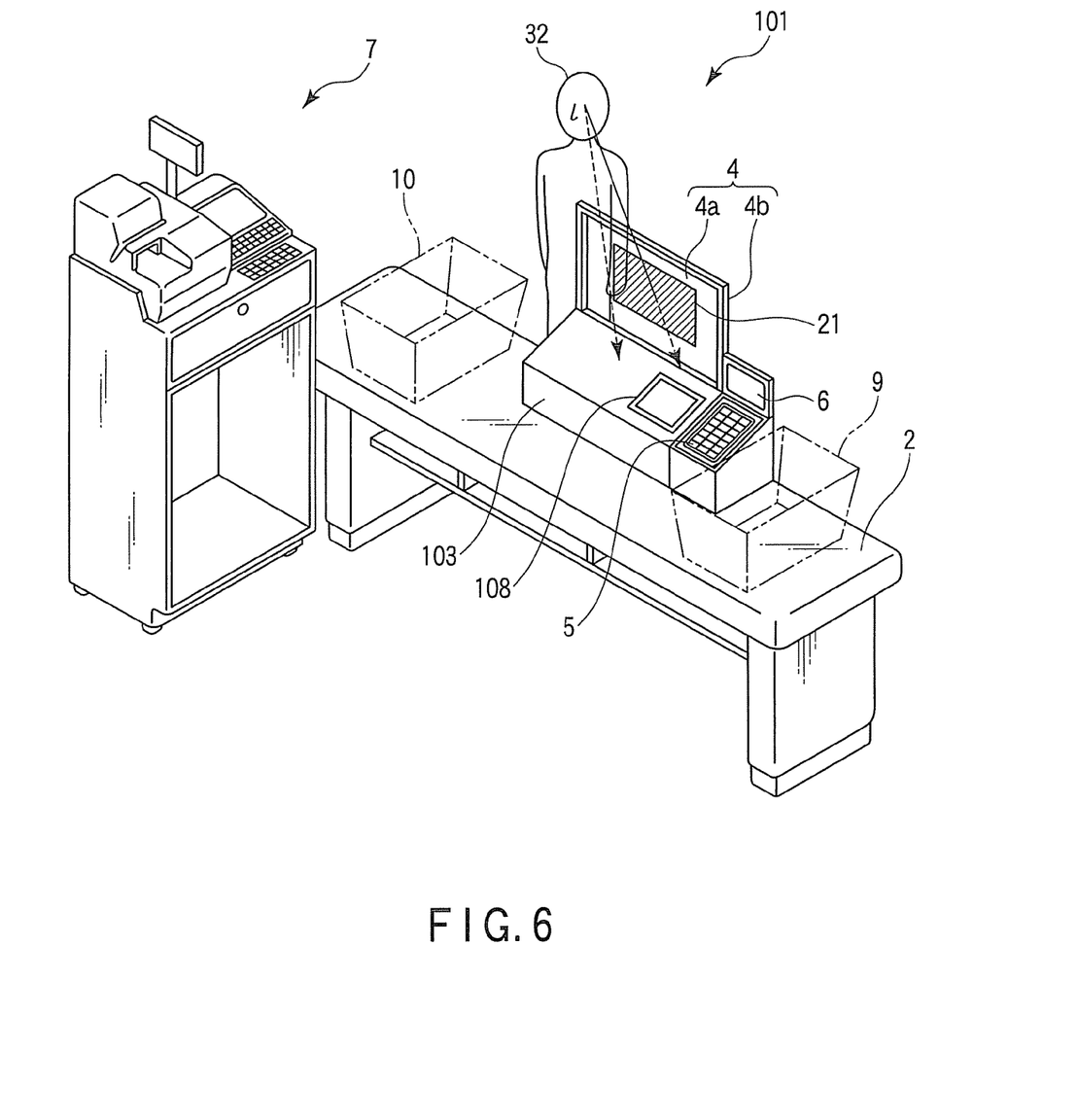
FIG. 6 is a view showing a settlement apparatus including a commodity information acquisition and display apparatus of a third embodiment.

In the third embodiment, a state described in FIG. 6, that is, a state in which a customer waits for settlement at a downstream side of a display 4 so as not to disturb subsequent customers is taken into consideration.

In FIG. 6, in a barcode reading device 103, a reading window 108 is provided to close to an end position so that the reading window is located at an upstream side in a movement direction of a commodity with respect to the center position of a screen 4a on which individual information 21 is displayed. Thus, a commodity information acquisition and display apparatus 101 has a structure in which the individual information 21 is displayed at the relatively downstream side of the reading window 108. By this, when a customer 32 visually recognizes the commodity read in the reading window 108, as indicated by an arrow shown in the figure, as compared with the case of FIG. 4, the line of sight of the customer passes through a position closer to the center on the individual information 21.

As stated above, in the third embodiment, the barcode reading device 103 is structured such that the reading window 108 is provided at the position shifted to the upstream side in the movement direction of the commodity with respect to the individual information 21. Thus, the customer waiting for the settlement at the downstream side of the checkout counter can reduce the movement of the line of sight when the commodity subjected to the reading operation and the individual information 21 are visually recognized.

Figure 7:
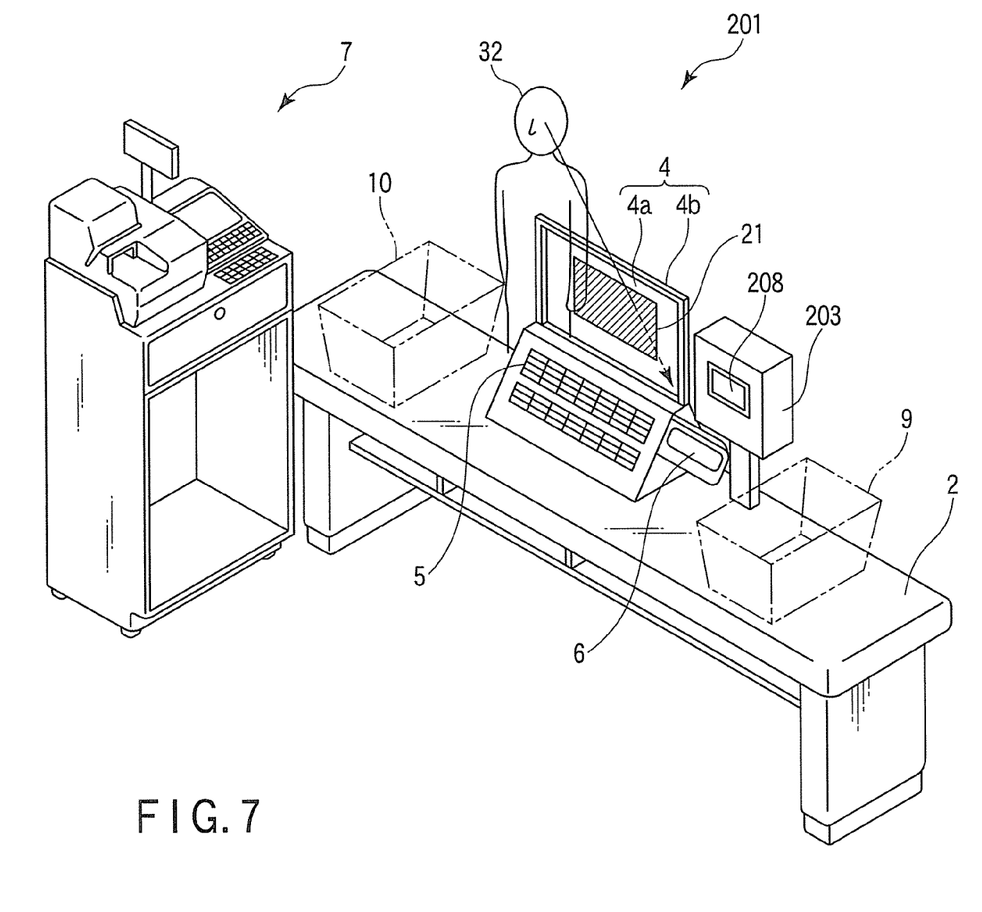
FIG. 7 is a view showing a settlement apparatus including a commodity information acquisition and display apparatus of a fourth embodiment.

Incidentally, in a fourth embodiment, when a positional relation is such that a commodity read by a reading window can be visually recognized by a customer through a display, as in a commodity information acquisition and display apparatus 201 shown in FIG. 7, a barcode reading device 203 may be completely made separate from a display 4.

The invention is not limited to the above embodiments, but may be suitably modified within the scope not departing from the gist of the invention.

In the embodiment, although the dual emission organic EL panel is adopted as the screen 4a, no limitation is made to this. Another display apparatus may be used as long as it has a viewing angle of at least about 120° in each of the up-and-down direction and the right-and-left direction with respect to the display surface of the screen 4a, and has the transparency.

Besides, as the commodity information input unit, although the description is made using the barcode reading device 3 having the reading window 8 through which the laser beam irradiated to the barcode symbol of the commodity enters and leaves, no limitation is made to this. In addition to this, for example, the invention also includes an embodiment in which a code reader having a reading window to capture an image of a two-dimensional code symbol attached to a commodity is used as a commodity information input unit.

Further, the commodity information master file data used when the information to be displayed based on the information inputted from the commodity is specified may be provided in the commodity information acquisition and display apparatus or the ECR according to the environmental condition such as the store scale, in addition to the storage in the store server.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A commodity information acquisition and display apparatus, comprising:

a commodity information input unit that has a reading window to read information from a held commodity, and acquires information from each commodity held to the reading window;

a display unit that has a screen made of a transparent or semitransparent member through which a visible light passes to display specified information based on the information from the commodity, and is provided above and adjacent to the reading window on the side of a customer to enable the customer to visually confirm passage of a visible image of the commodity through the screen and the displayed information on the screen simultaneously as the commodity passes by the reading window; and a display control unit to control the display of the information, wherein the display unit is installed on a checkout counter, and the display control unit moves a position of a commodity information display area on the screen in the same direction as a flow of the commodity on the checkout counter, from one direction to another direction on the screen for at least a specific section.

2. The apparatus according to claim 1, wherein the screen has a viewing angle of at least about 120° in each of an up-and-down direction and a right-and-left direction with respect to a display surface of the screen, and has transparency.

3. The apparatus according to claim 1, wherein the information displayed on the screen includes a character or a picture symbol representing the commodity.

4. The apparatus according to claim 1, wherein the screen to display the information includes a commodity information display area including a colored section subjected to a coloring process, a transmission factor of the colored section is set to be slightly lower than that of an outside of the colored section, and the colored section is semitransparent within a range that the customer can visually recognize the commodity and a salesclerk.

5. A settlement apparatus comprising:
a commodity information acquisition and display apparatus as recited in claim 1; and
an electronic cash register connected to the commodity information acquisition and display apparatus.

6. A commodity information acquisition and display apparatus, comprising:
a commodity information input unit that has a reading window to read information from a held commodity, and acquires information from each commodity held to the reading window;
a display unit that has a screen made of a transparent or semitransparent member through which a visible light passes to display specified information based on the information from the commodity, and is provided to be adjacent to the reading window to enable a customer to visually confirm passage of a visible image of the commodity through the screen and the displayed information on the screen simultaneously as the commodity passes by the reading window; and
a display control unit to control the display of the information, wherein
the screen to display the information includes a commodity information display area including a colored section subject to a coloring process, a transmission factor of the colored section is set to be slightly lower than that of an outside of the colored section, and the colored section is semitransparent within a range that the customer can visually recognize the commodity and a salesclerk.

7. A settlement apparatus, comprising:
a commodity information acquisition and display apparatus can recited in claim 6; and
an electronic cash register connected to the commodity information acquisition and display apparatus.

* * * * *